Oct. 29, 1935.  W. KOHLHAGEN  2,018,676
SYNCHRONOUS ELECTRIC MOTOR
Filed Jan. 16, 1934
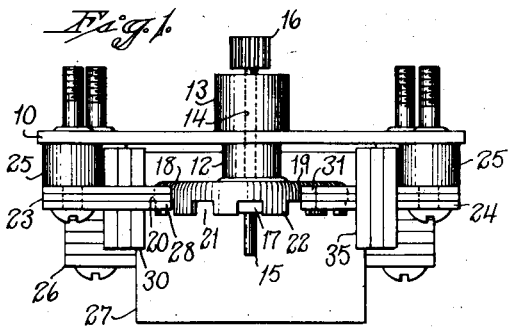
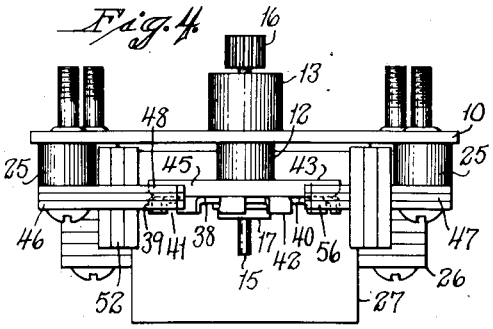
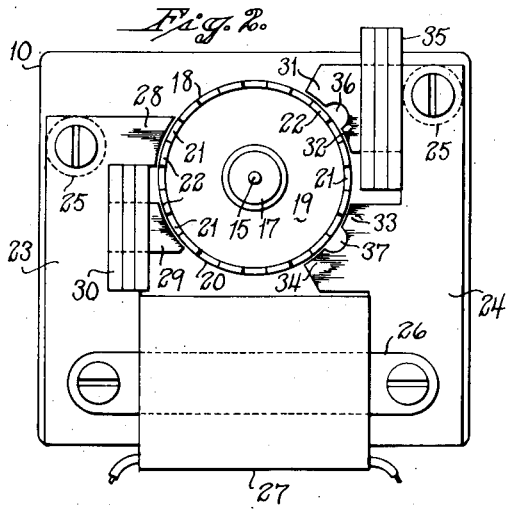
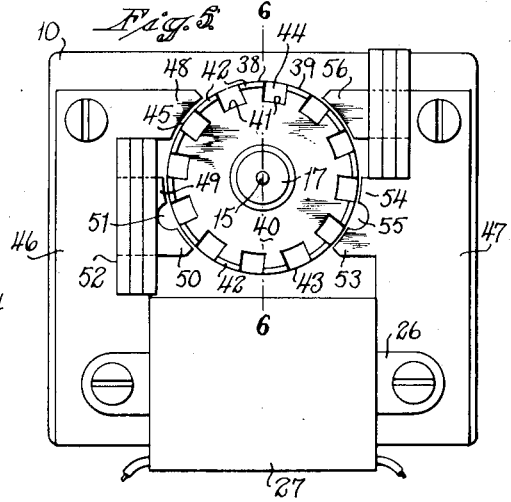
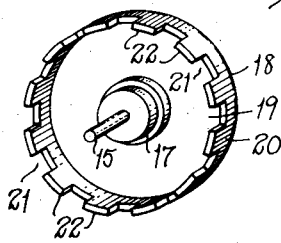
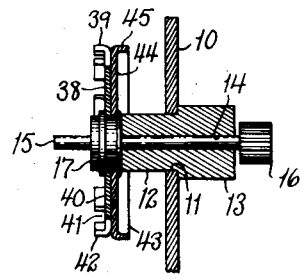
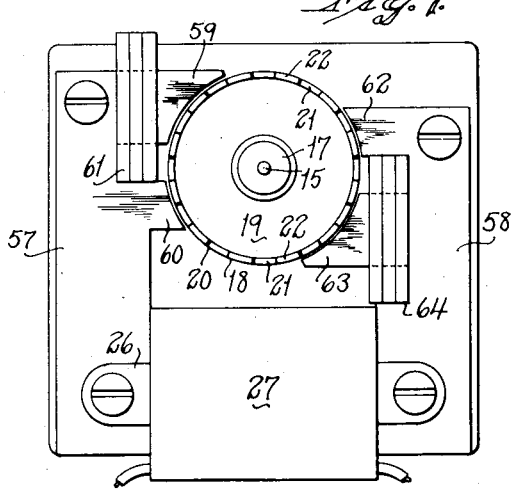

Patented Oct. 29, 1935

2,018,676

UNITED STATES PATENT OFFICE 2,018,676

SYNCHRONOUS ELECTRIC MOTOR

Walter Kohlhagen, Waterbury, Conn.

Application January 16, 1934, Serial No. 706,805

15 Claims. (Cl. 172—275)

This invention relates to an improvement in electric motors and particularly to that class of electric motors referred to as synchronous electric motors.

The present invention is particularly suited for embodiment in motors of the self-starting type, though not so limited.

One of the major problems confronting the designer of self-starting synchronous electric motors is to obtain a proper balance in the magnetic interlocking tendency between the rotor member and the stator member on one hand, and the rotating urge between the said members on the other hand. If the tendency of the rotor member to interlock with the stator member exceeds the tendency for relative rotation, the rotor member will not self-start. If, on the other hand, the force tending to rotate the rotor member materially exceeds the tendency thereof to synchronously interlock with the stator member at synchronous speed, then such a rotor member tends to over-speed. Or another possible action would be for the rotor to rotate synchronously but with a negligible amount of synchronous torque.

In the manufacture of non-self-starting synchronous electric motors, substantially the same difficulties as those above referred to must be confronted, inasmuch as if the interlocking tendency between the stator member and rotor member at or near zero speeds is excessive, great difficulty is encountered in manually causing the rotor to magnetically interlock with the stator member at synchronous speed.

One of the main objects of the present invention is to provide a synchronous electric motor having superior synchronous torque combined with ease and facility of starting.

A further object is to provide a simple, reliable and efficient synchronous electric motor in which the interlocking tendency between the rotor member and the stator member is at the minimum at or near zero speeds and is increased as the rotor member approaches and reaches synchronous speed.

Other objects and advantages will appear to those skilled in the art from the following, considered in conjunction with the accompanying drawing and the appended claims.

In the accompanying drawing:

Fig. 1 is an edge view of one form which a synchronous electric motor embodying the present invention may assume;

Fig. 2 is a face view thereof;

Fig. 3 is a perspective view of the rotor unit thereof detached;

Fig. 4 is an edge view of another form which a synchronous electric motor embodying the present invention may assume;

Fig. 5 is a face view thereof;

Fig. 6 is a transverse sectional view taken on the line 6—6 of Fig. 5; and

Fig. 7 is a face view of still another form of synchronous electric motor constructed in accordance with the present invention.

The particular self-starting synchronous electric motor herein chosen for illustration in Figs. 1, 2 and 3, includes a rectangular mounting-plate 10 preferably formed of brass or other non-magnetic material and provided with a mounting-opening 11 in which is mounted, with a force-fit, the reduced end 12 of a bearing-bushing 13. The said bearing-bushing is preferably formed of bronze or other anti-friction material and is provided with an axial bore 14 in which bears a rotor-shaft 15 extending at each of its respective opposite ends beyond the respective faces of the bearing-bushing 13 and carrying at one end a drive-pinion 16 and at its opposite end a collet 17.

Staked or otherwise secured to the collet 17 is a cup-shaped rotor generally designated by the numeral 18 and including a bottom wall 19 and a laterally-offsetting flange 20.

The rotor 18 is formed of iron, steel, or other suitable magnetic material (mild steel serving well), and has the edge of its flange 20 formed with an annular series of equidistant notches or gaps and a similar series of salient-poles 22 extending parallel with the axis of the rotor. For convenience of description, the salient-poles 22 just referred to will be designated as "minor-extent" salient-poles for the reason that their pitch-width is of lesser extent than the pitch-width of certain of the salient-poles of the stator structure, as will be presently described.

Cooperating with the salient-poles 22 and the smooth portion of the flange 20 of the rotor 18 for the purpose of turning the latter, is a stator structure comprising a pair of complementary laminated pole-pieces 23 and 24 mounted parallel in spaced relation with respect to the mounting-plate 10, by means of four (more or less) pillars 25. The said pole-pieces 23 and 24 are interconnected at their lower ends by a core-piece 26 mounting a usual electromagnet-coil 27.

The pole-piece 23 before referred to is formed with two salient-poles 28 and 29, each having a concave end-face located closely adjacent the periphery of the rotor 18. The salient-pole 29 is provided with a laminated short-circuiting or shading-coil 30 of well understood form and effect.

It will be noted that the end-faces of the pole-pieces 28 and 29 are each of such extent or pitch-width as to "overlap", so to speak, one of the salient-poles 22 of the rotor 18 and also one of the gaps 21 therebetween. Both of the salient-poles 28 and 29 are, therefore, of such extent as to provide a "magnetic bridge", so to speak, between two of the adjacent salient-poles 22 of the rotor 18 of such extent that as the said rotor turns, the magnetic path between each of the salient-poles 28 and 29 and the salient-poles 22 of the rotor 18 will be of substantially uniform capacity or reluctance at any given point in the rotation of the rotor.

From the foregoing it will be seen that, as the rotor turns so as to decrease the respective overlap of the salient-poles 28 and 29 with respect to any given one of the minor-extent salient-poles 22 of the rotor 18, the same movement will increase the overlap of the said poles 28 and 29 with respect to another minor-extent salient-pole 22 on the rotor 18. Therefore, for the purpose of convenience of description, the salient-poles 28 and 29 will be designated "major-extent" salient-poles, inasmuch as the end faces thereof exceed in pitch-width the pitch-width of the minor-extent salient-poles 22.

The pole-piece 24 of the stator structure is provided with salient-poles 31, 32, 33 and 34 having their respective end-faces suitably curved to substantially conform to the curvature of the periphery of the rotor and extending closely adjacent thereto, as clearly indicated in Fig. 2. The salient-poles 31 and 32 are both shaded by providing their common base portion with a laminated shading-coil 35, and are separated from each other by a notch or gap 36 substantially equal in width to the widths of both the gaps 21 and the salient-poles 22 of the rotor 18.

The gap between the adjacent salient-poles 32 and 33 of the pole-piece 24 is substantially equal to the combined width of one of the salient-poles 22 and one of the gaps or notches 21 of the rotor 18. The facial extent or pitch-widths of the salient-poles 33 and 34 and the gap or notch 37 therebetween have the same characteristics as the salient-poles 31 and 32 and the gap 36 before described.

When the electromagnet-coil 27 is energized from a source of alternating current, a time-lag in the magnetic flux passing through the salient-poles 31 and 32 will exist as compared to the magnetic flux passing through the salient-poles 33 and 34. Similarly, the flux passing through the salient-pole 29 will have a time-lag with respect to the flux passing through the salient-pole 28, so that what is commonly recognized as a "rotating-field" will be set up, tending to turn the rotor 18 in the direction indicated in Fig. 2.

Owing to the substantially uniform reluctance existing between the salient-poles 28 and 29 of the stator structure and the salient-poles 22 of the rotor 18, substantially no turning effort will be exerted upon the rotor 18 by the flux passing through the salient-poles 28 and 29. On the other hand, owing to their different facial-extent as compared to the salient-poles 28 and 29, the salient-poles 31, 32, 33 and 34 of the stator structure will exert a turning effort upon the rotor 18.

Owing to the paths of substantially-uniform reluctance afforded between the rotor 18 and the salient-poles 28 and 29, it has been found relatively easy to secure a self-starting motor with proper torque at synchronous speeds. In the structures above described and as shown in Figs. 1 to 3 inclusive, the tendency of the rotor to interlock with the stator structure at or near zero speeds is relatively negligible, but as the rotor approaches synchronous speeds, the tendency to interlock with the stator structure increases to such an extent that very appreciable and effective torque is obtained at synchronous speed.

By way of further explanation of the function of the uniform-reluctance path between the rotor 18 and the major-extent salient-poles 28 and 29, it will be noted by reference to Fig. 2 that the salient-pole 29, for instance, forms (as does also the pole 28) a "magnetic bridge", so to speak, between two of the immediately-adjacent minor-extent salient-poles 22 of the rotor 18. The bridge thus formed is of such span that as the rotor turns, the overlap of the pole 29 increases with respect to one of the poles 22 at the same time and to substantially the same degree that its overlap decreases with respect to the immediately-adjacent one of the poles 22. Thus, it may be said that the relationship between the major-extent poles 28 and 29 on one hand and the minor-extent poles 22 of the rotor 18 on the other hand is such that a given one of the said major-extent poles provides a flux-path which expands with respect to one of the minor-extent poles 22 at the same time and to substantially the same degree that the flux-path is contracted with respect to an immediately-adjacent one of the minor-extent poles 22.

In the self-starting synchronous motor illustrated in Figs. 4 and 5, the collet 17 mounts a cup-shaped rotor member 38 of magnetic material, comprising a flange 39 and a bottom-wall 40, and having both its flange and a portion of the said bottom member adjacent its periphery provided with an annular series of equidistant alternate notches or gaps 41 and salient-poles 42. Also mounted upon the collet 17 and in engagement with the member 38 is another cup-shaped rotor member 43 formed of magnetic material and having a bottom-wall 44 and a flange 45 offsetting in a direction opposite to the direction in which the flange 39 of the member 38 offsets, as clearly indicated in Fig. 6.

Arranged adjacent to the rotor structure comprising members 38 and 43, is a stator structure corresponding substantially to the stator structure shown in Figs. 1 to 3 inclusive and including two complementary pole-pieces 46 and 47, together with a core-piece 26 and coil 27.

The pole-piece 46 is provided with a major-extent salient-pole 48, the concave face of which is of a pitch-width equal to the joint pitch-width of one of the minor-extent salient-poles 42 and one of the gaps 41 of the member 38 and hence exerts no substantial stabilizing tendency upon the rotor. The said salient-pole 48 corresponds generally to the major-extent salient-pole 28 of the construction before described. The pole-piece 46 is also provided with two salient-poles 49 and 50, each of a pitch-width substantially corresponding to the pitch-width of the minor-extent salient-poles 42 of the rotor-member 38, and are separated from each other by a notch or gap 51 corresponding substantially to the notches or gaps 41 in the rotor member 38 before described.

Both of the salient-poles 49 and 50 above referred to exert an effort to pull the minor-extent salient-poles 42 with the rotor member 38 into alignment with themselves, and are shaded, so to speak, by having the base common to both of them provided with a laminated short-circuiting or shading coil 52.

The complementary pole-piece 47 is provided with two salient-poles 53 and 54, each of which substantially corresponds in pitch-width to the pitch-width of the minor-extent salient-poles 42 of the rotor member 38. The said salient-poles 53 and 54 are separated by a notch or gap 55 corresponding substantially in width to the width of the notches 41 in the member 38. Both of the said salient-poles 53 and 54, owing to their proportioning, exert a synchronous effort upon the rotor structure.

The pole-piece 47 is also provided with a shaded major-extent salient-pole 56 having a pitch-width substantially equal to the combined pitch-width of one of the minor-extent salient-poles 42 and one of the gaps or notches 41 of the rotor member 38, and hence exerting substantially no appreciable synchronous or interlocking force upon the rotor structure.

As thus constructed, the synchronous motor illustrated in Figs. 5 and 6 provides two complementary major-extent salient-poles (48 and 56) which exert substantially no synchronous or interlocking force upon the rotor-structure, and four salient-poles (49, 50, 53 and 54) so proportioned as to cause the rotor structure to synchronously interlock therewith. Furthermore, it will be noted that the rotor structure affords both salient-poles and a continuous annular surface upon which the salient-poles of the stator structure act with a hysteresis effect.

The synchronous motor structure illustrated in Fig. 7 has a rotor member corresponding to the rotor member 18 of the motors of Figs. 1 to 3 inclusive, and also includes complementary pole-pieces 57 and 58, core-piece 26 and coil 27.

The pole-piece 57 is provided with two salient-poles 59 and 60, the former of which is provided with a laminated shading-coil 61 and is of such pitch-width as to exert a synchronous interlocking effort upon the rotor 18. The complementary major-extent salient-pole 60, on the other hand, corresponds substantially to the salient-poles 28, 29, 48 and 56, referred to in connection with the previous constructions, and exerts no substantial interlocking force upon the rotor and, like the previous salient-poles referred to, provides a path of substantially-uniform reluctance for the magnetic flux.

The pole-piece 58 includes a major-extent salient-pole 62 corresponding in pitch-width to the major-extent salient-pole 60, and a salient-pole 63 having a laminated shading-coil 64, and corresponding substantially in pitch-width to the diametrically-opposite salient-pole 59.

All of the motor structures herein illustrated, it will be noted, are characterized by at least one salient-pole on the stator having a pitch-width of such extent as to provide a magnetic bridge between two of the salient-poles of the rotor, so that substantially regardless of the relative position of the salient-poles of the rotor, a path of substantially-uniform reluctance is provided at one given point at least.

It will be understood by those skilled in the art that, should it be desired for any reason to have the motors above described non-self-starting, this may be accomplished in a variety of ways, such, for instance, as by decreasing the amount of shading and/or by increasing the gaps between the salient-poles of the stators and the complementary rotors. When this is done, however, the manual starting of the rotor is still greatly facilitated.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A synchronous electric motor including in combination a stator unit having a plurality of salient-poles; and a rotor unit also having a plurality of salient-poles cooperating with the salient-poles of the said stator unit; at least one of the salient-poles of one of said units being of major-facial extent in a direction circumferentially of the rotor as compared to the salient-poles of the other of said units which are of minor-facial extent; the said major-extent and minor-extent salient-poles being proportioned relative to each other to provide a magnetic flux-path of substantially-uniform reluctance between the two said units at substantially all positions of relative movement therebetween, the said stator unit also having a portion cooperating with the salient-poles of the rotor unit and providing a flux path therebetween which varies in reluctance as the said rotor unit moves with respect to the said stator unit.

2. A synchronous electric motor including in combination a stator unit having a plurality of salient-poles; a rotor unit also having a plurality of salient-poles cooperating with the salient-poles of the said stator unit; at least one of the salient-poles of the said stator unit being of major-facial extent in a direction circumferentially of the rotor as compared to the salient-poles of the said rotor unit which are of minor-facial extent; the said major-extent and minor-extent salient-poles being proportioned relative to each other to provide a magnetic path of substantially-uniform reluctance between the two said units at substantially all positions of relative movement therebetween, the said stator unit also having a portion cooperating with the salient-poles of the rotor unit and providing a flux path therebetween which varies in reluctance as the said rotor unit moves with respect to the said stator unit.

3. A synchronous electric motor including in combination a stator unit having a plurality of salient-poles; and a rotor unit also having a plurality of salient-poles cooperating with the salient-poles of the said stator unit; at least one of the salient-poles of one of the said units being of major-facial extent in a direction circumferentially of the rotor as compared to the salient-poles of the other of said units which are of minor-facial extent; the said major-extent pole being so proportioned as to form a magnetic bridge between two of the said minor-extent poles of such span as to provide for contracting the flux-path between the said major-extent pole and one of the said minor-extent poles at the same time and to substantially the same degree that the flux-path expands between the said major-extent pole and the other of the said minor-extent poles, the said stator unit also having a portion cooperating with the salient-poles of the rotor unit and providing a flux path therebetween which varies in reluctance as the said rotor unit moves with respect to the said stator unit.

4. A synchronous electric motor including in combination a stator unit having a plurality of salient-poles; and a rotor unit also having a plurality of salient-poles cooperating with the salient-poles of the said stator unit; at least one of the salient-poles of one of the said units being of major-facial extent in a direction circumferentially of the rotor as compared to the salient-poles of the other of said units which are of minor-facial extent; the said major-extent pole being so proportioned as to form a magnetic bridge between an immediately-adjacent pair of the said minor-extent poles of such span as to provide for contracting the flux-path between the said major-extent pole and one of the said minor-extent poles at the same time and to substantially the same degree that the flux path expands between the said major-extent pole and the other of the said immediately-adjacent pair of minor-extent poles, the said stator unit also having a portion cooperating with the salient-poles of the rotor unit and providing a flux path therebetween which varies in reluctance as the said rotor unit moves with respect to the said stator unit.

5. A synchronous electric motor including in combination a stator unit having a plurality of salient-poles; and a rotor unit also having a plurality of salient-poles cooperating with the salient-poles of the said stator unit; at least one of the poles of the said stator unit being of major-facial extent in a direction circumferentially of the rotor as compared to the salient-poles of the said rotor unit which are of minor-facial extent; the said major-extent pole of the stator unit being so proportioned as to form a magnetic bridge between two of the said minor-extent poles of such span as to provide for contracting the flux-path between the said major-extent pole and one of the said minor-extent poles of the rotor unit at the same time and to substantially the same degree that the flux-path expands between the said major-extent pole and the other of the said minor-extent poles, the said stator unit also having a portion cooperating with the salient-poles of the rotor unit and providing a flux path therebetween which varies in reluctance as the said rotor unit moves with respect to the said stator unit.

6. A synchronous electric motor including in combination a stator unit having a plurality of salient-poles; and a rotor unit also having a plurality of salient-poles cooperating with the salient-poles of the said stator unit; at least one of the poles of the said stator unit being of major-facial extent in a direction circumferentially of the rotor as compared to the salient-poles of the said rotor-unit which are of minor-facial extent; the said major-extent pole of the stator unit being so proportioned as to form a magnetic bridge between an immediately-adjacent pair of the said minor-extent poles, to provide for contracting the flux-path between the said major-extent pole of the stator unit and one of the said minor-extent poles at the same time and to substantially the same degree that the flux-path expands between the said major-extent pole and the said immediately-adjacent pair of minor-extent poles, the said stator unit also having a portion cooperating with the salient-poles of the rotor unit and providing a flux path therebetween which varies in reluctance as the said rotor unit moves with respect to the said stator unit.

7. A self-starting synchronous electric motor including in combination a stator unit having a plurality of salient-poles; a rotor unit also having a plurality of salient-poles cooperating with the salient-poles of the said stator unit; at least two of the salient-poles of the said stator unit being of major-facial extent in a direction circumferentially of the rotor as compared to the salient-poles of the said rotor unit which are of minor-facial extent; short-circuiting means around one of the said major-extent poles of the stator unit and providing a rotating-field effect; the said major-extent poles being so proportioned as to each form a magnetic bridge between two of the said minor-extent poles of the rotor unit, the said bridge being of such span as to provide for contracting the flux-path between a given one of the said major-extent poles and one of the said minor-extent poles of the rotor unit at the same time and to substantially the same degree that the flux-path expands between the said major-extent pole and another of the said minor-extent poles. the said stator unit also having a portion cooperating with the salient-poles of the rotor unit and providing a flux path therebetween which varies in reluctance as the said rotor unit moves with respect to the said stator unit.

8. A self-starting synchronous electric motor including in combination a stator unit having a plurality of salient-poles; a rotor unit also having a plurality of salient-poles cooperating with the salient-poles of the said stator unit; at least two of the salient-poles of the said stator unit being of major-facial extent in a direction circumferentially of the rotor as compared to the salient-poles of the said rotor unit which are of minor-facial extent; short-circuiting means around one of the said major-extent poles of the stator unit and providing a rotating-field effect; the said major-extent poles being so proportioned as to each provide a magnetic bridge between an immediately-adjacent pair of the said minor-extent poles of such span as to provide for contracting the flux-path between the said major-extent pole and one of the said minor-extent poles at the same time and to substantially the same degree that the flux-path expands between the said major-extent pole and the said immediately-adjacent pair of minor-extent poles, the said stator unit also having a portion cooperating with the salient-poles of the rotor unit and providing a flux path therebetween which varies in reluctance as the said rotor unit moves with respect to the said stator unit.

9. A synchoronus electric motor including in combination a stator unit having a plurality of salient-poles; a rotor unit also having a plurality of salient-poles cooperating with the salient-poles of the said stator unit; at least one of the salient-poles of the said stator unit being of major pitch-width as compared to the salient-poles of the said rotor unit which are of minor pitch-width; the said major-width salient-poles of the said stator unit having a pitch-width substantially equal to the pitch-width of one of the said minor-width poles of the rotor unit plus the pitch-width of a space therebetween; the said stator unit also having salient-poles other than said major pitch-width poles complementing the latter but producing a synchronous torque in the said rotor.

10. A self-starting synchronous electric motor including in combination a stator unit having a plurality of salient-poles; a rotor unit also having a plurality of salient-poles cooperating with the salient-poles of the said stator unit; at least two of the said poles of the said stator unit being of major-pitch width as compared to the salient-poles of the said rotor unit which are of minor-pitch width; short-circuiting means around one of the said major-width poles of the said stator unit and providing a rotating-field effect; the said major-width salient-poles of the said stator unit each having a pitch-width substantially equal to the pitch-width of one of the said minor-width poles of the rotor unit plus the pitch-width of a space therebetween, the said stator unit also having a portion cooperating with the salient-poles of the rotor unit and providing a flux path therebetween which varies in reluctance as the said rotor unit moves with respect to the said stator unit.

11. A synchronous electric motor including a stator unit having a plurality of salient-poles; and a rotor unit having a relatively-smooth peripheral portion and a portion provided with a plurality of salient-poles, both of the said portions cooperating with the salient-poles of the said stator unit; at least one of the salient-poles of the said stator unit being of major-facial extent in a direction circumferentially of the rotor as compared to the salient-poles of the said rotor unit which are of minor-facial extent; the said major-extent and minor-extent salient-poles being proportioned relative to each other to provide a magnetic path of substantially-uniform reluctance between the two said units at substantially all positions of relative movement therebetween, the said stator unit also having a portion cooperating with the salient-poles of the rotor unit and providing a flux path therebetween which varies in reluctance as the said rotor unit moves with respect to the said stator unit.

12. A synchronous electric motor including in combination a stator unit having a plurality of salient-poles; and a cup-shaped rotor unit having a flange extending substantially parallel with its axis and notched to provide a plurality of salient-poles and a relatively-smooth peripheral surface for cooperation with the salient-poles of the said stator unit; at least one of the salient-poles of the said stator unit being of major-facial extent in a direction circumferentially of the rotor as compared to the salient-poles of the said rotor unit which are of minor-facial extent; the said major-extent and minor-extent salient-poles being proportioned relative to each other to provide a magnetic path of substantially-uniform reluctance between the two said units at substantially all positions of relative movement therebetween, the said stator unit also having a portion cooperating with the salient-poles of the rotor unit and providing a flux path therebetween which varies in reluctance as the said rotor unit moves with respect to the said stator unit.

13. A self-starting synchronous electric motor including in combination a stator unit having means producing a rotating-field effect and at least two pole-pieces respectively of opposite instantaneous polarity and each having salient-poles; and a rotor unit also having salient-poles cooperating with the salient-poles of the said stator unit; the salient-poles of one of the said pole-pieces being proportioned with respect to the salient-poles of the said rotor unit so as to provide a path of substantially uniform reluctance between the said rotor and stator units and the salient-poles of the other of said pole-pieces being proportioned to provide a path of non-uniform reluctance between the said rotor and stator units.

14. A self-starting synchronous electric motor including in combination a stator unit having at least two pole-pieces respectively of opposite instantaneous polarity and each having salient-poles; a rotor unit also having salient-poles cooperating with the salient-poles of the said stator unit; the salient-poles of one of the said pole-pieces being proportioned with respect to the salient-poles of the said rotor unit so as to provide a path of substantially uniform reluctance between the said rotor and stator units and the salient-poles of the other of said pole-pieces being proportioned to provide a path of non-uniform reluctance between the said rotor and stator units; and one or more shading-coils on said stator unit to provide a rotating-field effect.

15. A synchronous electric motor including in combination: a stator unit having a plurality of salient-poles; and a rotor unit also having a plurality of salient-poles cooperating with the salient-poles of the said stator unit; the said stator unit having at least one salient-pole proportioned with respect to the salient-poles of the rotor unit to provide a flux path between the two said units of substantially uniform reluctance at substantially all rotary positions of the said rotor unit; the said stator unit also having at least one salient-pole producing a synchronous torque upon the said rotor unit.

WALTER KOHLHAGEN.